United States Patent
Hsu-Hung et al.

(10) Patent No.: US 9,378,101 B2
(45) Date of Patent: *Jun. 28, 2016

(54) AUTOMATIC FAILURE RECOVERY USING SNAPSHOTS AND REPLICAS

(71) Applicant: Dell Products, LP, Round Rock, TX (US)

(72) Inventors: Damon Hsu-Hung, Sudbury, MA (US); Kannan Sasi, Nashua, NH (US)

(73) Assignee: Dell Products, LP, Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/754,970

(22) Filed: Jun. 30, 2015

(65) Prior Publication Data

US 2015/0309887 A1 Oct. 29, 2015

Related U.S. Application Data

(63) Continuation of application No. 13/796,876, filed on Mar. 12, 2013, now Pat. No. 9,141,495.

(51) Int. Cl.
*G06F 11/00* (2006.01)
*G06F 11/14* (2006.01)
*G06F 11/20* (2006.01)

(52) U.S. Cl.
CPC ........ *G06F 11/1469* (2013.01); *G06F 11/1451* (2013.01); *G06F 11/2082* (2013.01); *G06F 11/2071* (2013.01); *G06F 11/2094* (2013.01); *G06F 2201/84* (2013.01)

(58) Field of Classification Search
USPC .......................................................... 714/15
See application file for complete search history.

(56) References Cited

U.S. PATENT DOCUMENTS

| | | | |
|---|---|---|---|
| 5,740,357 A | 4/1998 | Gardiner et al. | |
| 6,516,314 B1 * | 2/2003 | Birkler | G06F 17/30578 707/621 |
| 7,681,072 B1 | 3/2010 | Gibson et al. | |
| 8,417,987 B1 | 4/2013 | Goel et al. | |
| 8,527,990 B1 * | 9/2013 | Marathe | G06F 9/45558 718/1 |
| 9,098,444 B2 | 8/2015 | Hsu-Hung | |
| 9,141,495 B2 | 9/2015 | Hsu-Hung et al. | |
| 2004/0268178 A1 | 12/2004 | Fredin | |
| 2004/0268179 A1 | 12/2004 | Stewart | |
| 2005/0005200 A1 * | 1/2005 | Matena | G06F 9/5072 714/38.13 |
| 2006/0015767 A1 | 1/2006 | Sun Hsu et al. | |
| 2009/0113241 A1 * | 4/2009 | van Ingen | G06F 11/0715 714/21 |
| 2009/0249119 A1 * | 10/2009 | Sethumadhavan | G06F 11/1469 714/15 |
| 2009/0276661 A1 * | 11/2009 | Deguchi | G06F 11/1471 714/18 |
| 2012/0192037 A1 | 7/2012 | Gibson et al. | |
| 2014/0281690 A1 | 9/2014 | Hsu-Hung et al. | |
| 2014/0281697 A1 | 9/2014 | Hsu-Hung | |
| 2015/0309888 A1 | 10/2015 | Hsu-Hung | |

* cited by examiner

*Primary Examiner* — Sarai Butler
(74) *Attorney, Agent, or Firm* — Hamilton, Brook, Smith & Reynolds, P.C.

(57) ABSTRACT

In one embodiment, a method of data recovery in a storage system includes, upon failure to fulfill an I/O request for requested data to a primary volume, consulting a change set to determine whether the requested data are current in a snapshot or replica. Further, such an embodiment includes providing the requested data using the snapshot or replica without further accessing the change set, if the requested data are current in the snapshot or replica, or issuing an error or failure status, if the requested data are not current.

20 Claims, 12 Drawing Sheets

AUTOMATIC FAILURE RECOVERY USING SNAPSHOTS AND REPLICAS

RELATED APPLICATIONS

This application is a continuation of U.S. application Ser. No. 13/796,876, filed Mar. 12, 2013. Further, this application is related to U.S. application Ser. No. 13/796,844, by Damon Hsu-Hung, filed Mar. 12, 2013. The entire teachings of the above applications are incorporated herein by reference.

BACKGROUND OF THE INVENTION

Drive media errors can be hidden from a user by employing Redundant Array of Independent Disks (RAID) reconstruction. However, RAID reconstruction can fail during degraded operation and a media error then results in a RAID puncture.

SUMMARY OF THE INVENTION

The data lost in such a RAID puncture can be found to survive elsewhere in the system. For instance, the data can still be found in a cache, a snapshot, or a replica in certain instances.

In one embodiment, a method of recovering data in a storage system includes issuing an I/O request from, and returning a failure status or request for help to a virtualization layer that manages snapshots or replicas, and the method may further include determining whether the failed I/O request references data that is current in a replica or snapshot by consulting a change set or a change log.

In another embodiment, a method of recovering data in a storage system may include, upon failure to fulfill an I/O request to the primary volume, determining whether the I/O request references data addresses that may exist in a snapshot or replica. The method may further include consulting a change set to determine whether the referenced data addresses in the snapshot or replica are current. The method may additionally include fulfilling the I/O request by accessing the snapshot or replica, if the referenced data addresses are current, or issuing an error or failure status, if the referenced data addresses are not current.

The change set may further indicate at least one address in the replica or snapshot that is no longer current. For example, the change set can indicate that the data at that address has changed on a disk that services the replica or snapshot. A change log is a type of change set that further comprises a chronological list of the operations that have yet to be applied to addresses in a replica. Other embodiments of change sets, such as change logs, may be employed in the method.

The method may further include, if a change set exists on a copy-on-write region, employing the change set to fulfill the failed I/O request or help response.

In another embodiment, the system may support synchronous replicas. The method may additionally include determining whether the I/O request references data addresses that may exist in a synchronous replica and determining whether the synchronous replica is synchronized with the primary volume. The method may further include consulting a change set, if the replica is unsynchronized, to determine whether the referenced data addresses in the snapshot or replica are current. The method may additionally include fulfilling the I/O request by accessing the synchronous replica, if the replica is synchronized or if the replica is unsynchronized but the referenced data addresses are current according to the change set, or issuing an error or failure status, if the replica is unsynchronized and the referenced data addresses are not current according to the change set.

In another embodiment, the system may support synchronous replicas. The method may further include determining whether the I/O request references data addresses that may exist in a synchronous replica and determining whether the synchronous replica was synchronized with the primary volume at the time of the I/O request, and has remained synchronized since that time. The method may further include, if the replica is synchronized in this way, fulfilling the I/O request by accessing the synchronous replica, and if the replica is not synchronized in this way, attempting to insert into the change log an access operation to fulfill the I/O request, as follows: (a) if the I/O request occurred before the loss of synchronization, inserting the access operation at the head of the change log, if the head of the change log is still valid, (b) if the I/O request occurred after the loss of synchronization, inserting the access operation at the tail of the change log, if the tail of the change log is still valid, (c) if the I/O request occurred during the loss of synchronization, inserting the access operation within the change log in chronological order, if such a location in the change log is still valid. The method may further include issuing an error or failure status, if the access operation cannot be inserted into a valid position in the change log and applying or replaying the change log to the replica to restore synchronization, wherein any inserted access operations are fulfilled in chronological order with the applied changes.

In another embodiment, the change log may include at least one of an ordered list of changes to be applied to a replica to restore synchronization and other operations such as data access requests; and entries in the change log are invalidated when successfully applied to the replica.

In another embodiment, a system for recovering data in a storage stack with a virtualization layer that manages snapshots or replicas, may include a failure recovery module configured to process a failed I/O request, by determining whether the failed I/O request references data that is current in a replica or snapshot by consulting a change set or a change log and accessing, if so, the replica or snapshot to fulfill the failed I/O request.

In yet another embodiment, a non-transitory computer readable medium is configured to store instructions for managing snapshots or replicas in a virtualization layer to be executed by a processor, where the instructions include processing a failed I/O request by determining whether the failed I/O request references data that is current in a replica or snapshot by consulting a change set or a change log and accessing, if so, the replica or snapshot to fulfill the failed I/O request.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
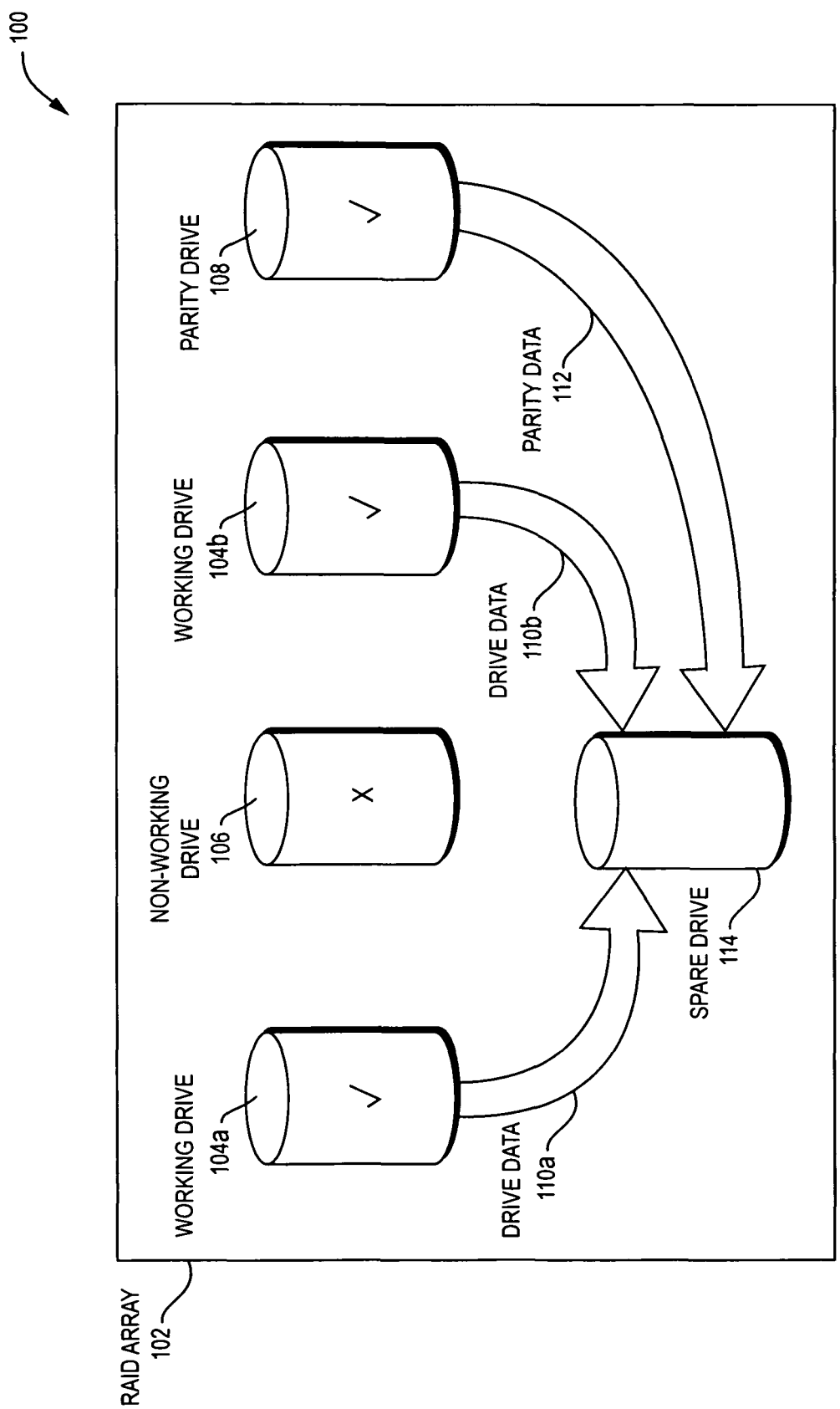
FIG. 1A is a block diagram illustrating an example embodiment of a RAID array.

A description of example embodiments of the invention follows. The teachings of all patents, published applications and references cited herein are incorporated by reference in their entirety.

An asynchronous replica is a copy of a primary volume, and is kept up to date at regular intervals specified by the user. The asynchronous replica can be useful for recovering data that is unchanged since creation of a most recent asynchronous replica. In the case of asynchronous replicas, a system can determine whether data can be recovered from the asynchronous replica.

Virtualization layers (such as LV/IOM layers in a Dell Equallogic system) maintain a change set for every primary volume that has an asynchronous replica. The change set indicates data addresses in the primary volume that have newer data than in the asynchronous replica. When a replication interval expires, every data address indicated in the change set is copied from the primary volume to the replica, and the change set is emptied (e.g., zeroed or reset). Therefore, a replica volume is the same as the primary volume except for the data addresses listed in the change set. Any read request that cannot be satisfied by the primary volume or the storage that services it, and does not request data from any address indicated in the change set, can be redirected to the replica.

Data can also be recovered from local snapshots in the same manner, with one proviso: the snapshot page cannot yet have been Copy-On-Writed (COWed). Snapshot pages are represented as change sets until the COW operation is complete, at which point, the change set is emptied, and it is no longer possible to identify which parts of the snapshot page that are current and which are not. COW operations may be delayed indefinitely (e.g., until it is either convenient or necessary to execute them). An embodiment could retain tens of thousands of delayed COWs that may be able to supply the missing data.

In the case of synchronous replicas, a primary volume and a synchronous replica are actively maintained to be identical, such as by requiring that any change applied to the primary volume must not be visible until the same change is applied to the synchronous replica. As long as the synchronization rule is maintained, the primary and replica volumes are effectively identical, and recovering data is even easier because change sets do not need to be checked.

Exceptional conditions, such as an interruption of communications, can cause synchronization to be lost between the primary volume and a synchronous replica. In some embodiments, a change set may be employed when synchronization is lost, at which point the synchronous replica is treated similar to an asynchronous replica: the change set indicates data addresses in the primary volume that have newer data than in the now-unsynchronized replica. Therefore, an unsynchronized replica is the same as the primary volume except for the data addresses listed in the change set. Any read request that cannot be satisfied by the primary volume or the storage that services it, and does not request data from any address indicated in the change set (if any), can be redirected to the replica. When the exceptional condition is resolved, such as by restoring communications, every data address indicated in the change set is copied from the primary volume to the replica to re-synchronize it, and the change set is emptied (e.g., zeroed or reset). Requests that have been redirected to the replica may need to wait for re-synchronization to complete.

In yet other embodiments, a change log may be employed if synchronization is lost. A change log is a chronological list of the changes that were applied to the primary but not to the replica, i.e., it is an ordered sequence of changes that must be applied to the replica in order to bring it back into synchronization. Any read request that cannot be satisfied by the primary volume or the storage that services it can be redirected to the replica as follows. If the read request originally arrived at the primary volume prior to the loss of synchronization, then the read request must be inserted at the head of the change log. If the read request originally arrived after the loss of synchronization, then the request must be inserted at the end of the change log. If the read request originally arrived during the loss of synchronization, it must be inserted within the change log in chronological order. When the exceptional condition is resolved, the change log is applied to the replica in chronological order, including any read requests that may have been inserted.

As each entry in a change log is applied to the replica, said entry is invalidated. A change log may be in the process of being applied when the read request to the primary volume fails, such that the location in the change log where the read request must now be inserted may no longer be valid. In this case, the read request cannot be recovered from the replica.

FIG. 1A is a block diagram 100 illustrating an example embodiment of a RAID array 102. The RAID array 102 includes working drives 104a and 104b, a non-working drive 106, and a parity drive 108. The non-working drive 106 previously stored data that is now inaccessible because of the non-working status of the drive 106. The parity drive 108 stores bits of data that, when combined with all but one of the drives in the RAID array 102, can re-create the data previously stored on the non-working drive 106, or a non-working sector of the non-working drive 106. In this manner, drive data 110a and 110b from working drives 104a and 104b respectively, combined with parity data 112, can create data for spare drive 114 that duplicates the data stored in the non-working drive 106.

Figure 1B:
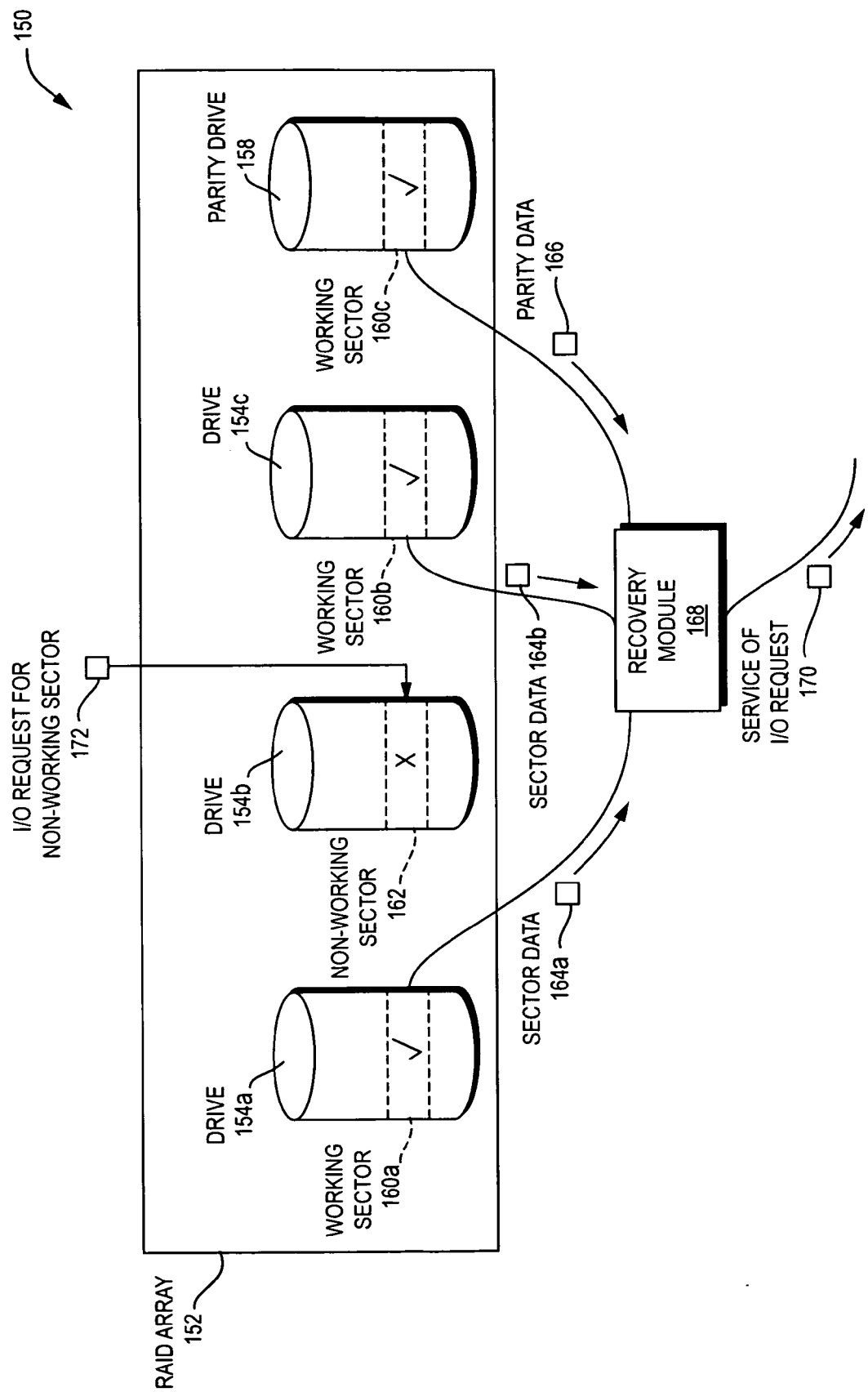
FIG. 1B is a block diagram illustrating an example embodiment of a RAID array.

FIG. 1B is a block diagram 150 illustrating an example embodiment of a RAID array 152. The RAID array 152 includes drives 154a-c and a parity drive 158. Drive 154a includes working sector 160a, drive 154b includes non-working sector 162, drive 154c includes working sector 160b, and parity drive 158 includes working sector 160c. The RAID array 152 receives an input/output (I/O) request 172 for the non-working sector 162. The RAID array 152 then reconstructs the data of the non-working sector 162 using the drives 154a, 154c and parity drive 158 because the non-working sector 162 is damaged and cannot be read. The RAID array 152 reconstructs the non-working sector 162 by combining working sector 160a, working sector 160b, and working sector 160c. The sector data 164a of the working sector 160a, sector data 164b of working sector 160b, and parity data 166 of working sector 160c are combined by a recovery module 168, which outputs a service of I/O request 170. The service of I/O request 170 includes a regenerated version of the data in the non-working sector 162. In this manner, the I/O request 172 does not generate an error because the RAID array 152 can reconstruct the data of the non-working sector 162.

Figure 2A:
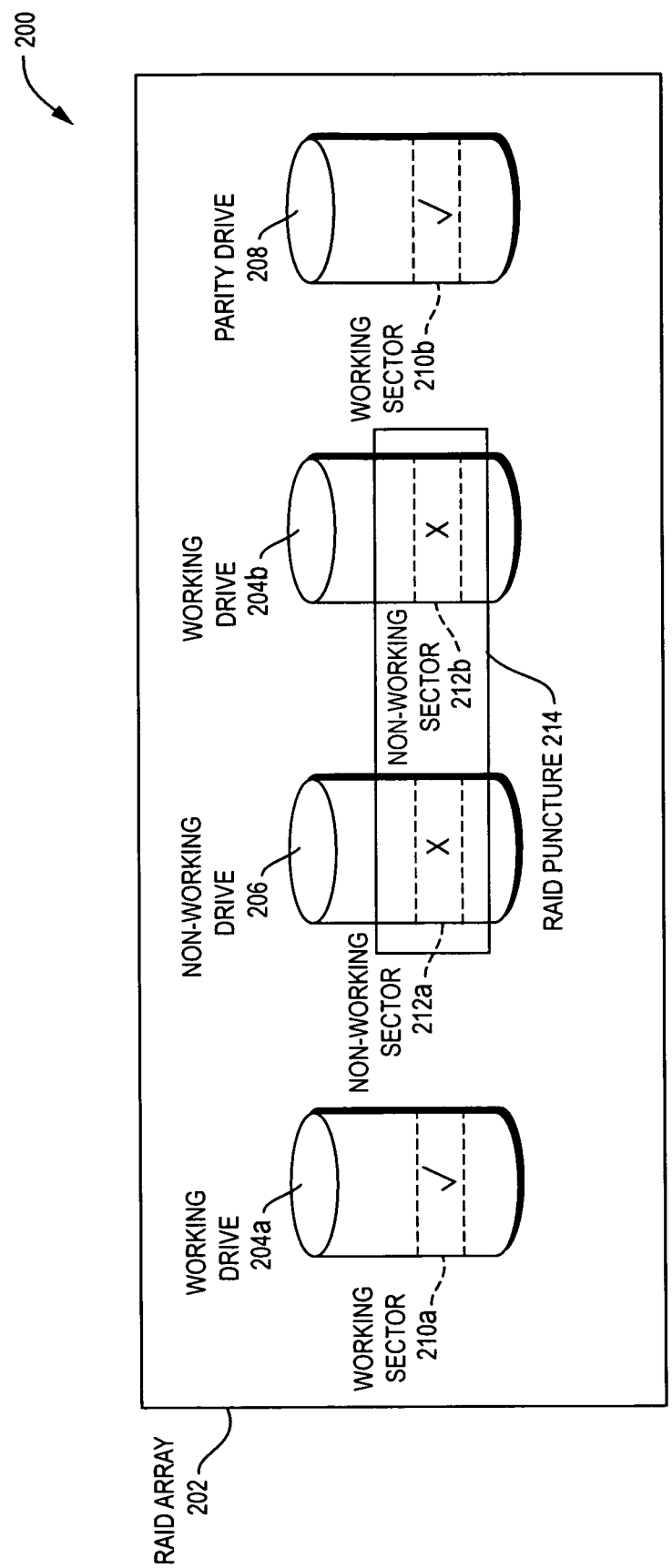
FIG. 2A is a block diagram illustrating another embodiment of a RAID array.

FIG. 2A is a block diagram 200 illustrating another embodiment of a RAID array 202. In this embodiment, the RAID array 202 includes working drives 204a-b, non-working drive 206, and a parity drive 208. The working drive 204a includes a working sector 210a. The working drive 204b, however, includes a non-working sector 212b. The non-working drive 206 includes a non-working sector 212a, that corresponds to working sectors 210a-b and non-working sector 212b. In fact, since the non-working drive 206 is disabled, none of its sectors are working. The parity drive 208 includes working sector 210b. The RAID array 202 cannot reconstruct data from the non-working sectors 212a-b because too much data is missing from the RAID array 202. The non-working sectors 212a-b, which correspond to each other in location on their respective drives, are considered as a RAID puncture 214. The RAID puncture 214 prevents the recovery of data because two pieces of data are missing. The RAID puncture 214 can also be caused by two fully non-working drives, or by two working drives with two non-working sectors that happened to be in the same location on the respective drives. The latter can be less common because it requires the locations to coincide with each other, however it is possible.

Figure 2B:
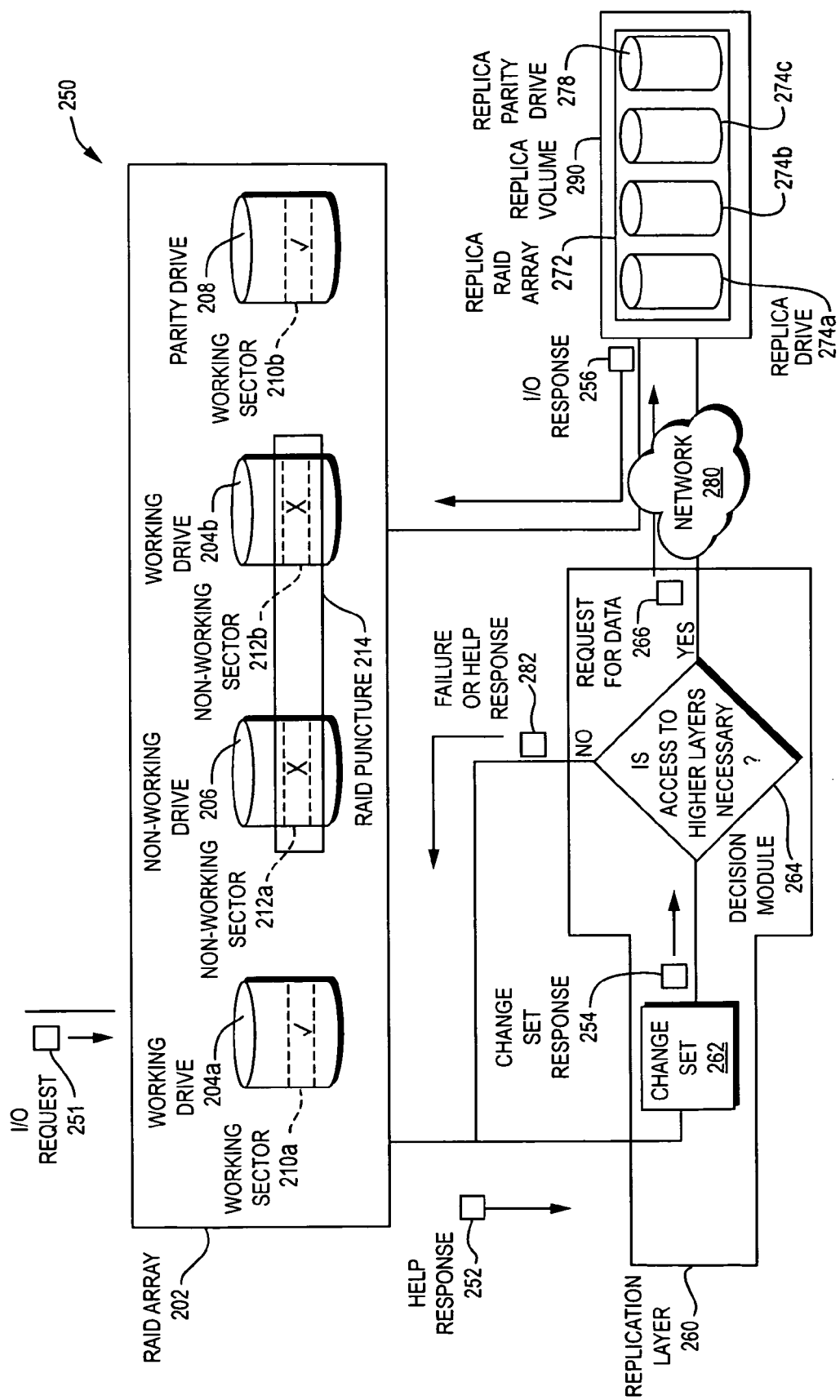
FIG. 2B is a block diagram illustrating an example embodiment of the RAID array employing an asynchronous replica to recover data from the RAID puncture.

FIG. 2B is a block diagram 250 illustrating an example embodiment of the RAID array 202 employing replication layer 260 to recover data from the RAID puncture 214. Upon receiving an I/O request 251 to read data in the RAID puncture 214, the RAID array 202 determines that it can not load that data because of the RAID puncture 214 and issues a help response 252 to the replication layer 260. The replication layer 260 includes a change set 262, which indicates addresses within the replicated volume housed within drives of the RAID array 202, where the data at those addresses has been changed since the last download to the replica.

Upon receiving the help response 252, the replication layer 260 checks the change set 262 to see whether the data addresses associated with the help response 252 is either current or has been changed since the last download. The change set 262 issues that answer in the change set response 254, for instance, to a decision module 264. If the change set response 254 indicates that the requested data addresses in the replica volume 290 are current, the replication layer 260 issues a request for data 266 to the replica volume 290 through a network 280. The replica volume 290 can include the same structure of storage as the original volume, which in this case would be the same structure as RAID array 202 and drives 204a-b, 206, and 208. In this case, the replica volume 290 may be housed in a RAID array 272 that is substantially similar to RAID array 202, which itself includes drives 274a-c and parity drive 278 that are substantially similar to the respective drives of the RAID array 202. However, the replica volume 270 can include different storage structures for different storage systems. The replica volume issues an I/O response 256 over the network 280 to the replication layer 260 responsive to the request for data 266. The replication layer 260 then returns the I/O response 256 to the RAID array 202, which uses the I/O response 256 to handle the initial I/O request to the RAID puncture 214, and also to repair the RAID puncture 214. This method can help avoid errors to I/O requests directed to RAID punctures 254 in the RAID array 202. The method may further pass I/O response 256 as a direct response to I/O request 251 that was originally directed at the RAID array 202. This especially may happen if request 251 was issued from replication layer 260 in the first place.

On the other hand, if the decision module 264 determines that access to the asynchronous replica is invalid based on the change set response 254, the replication layer 260 may issue a failure response, or a help response 282 that is directed to a yet another layer.

Figure 3:
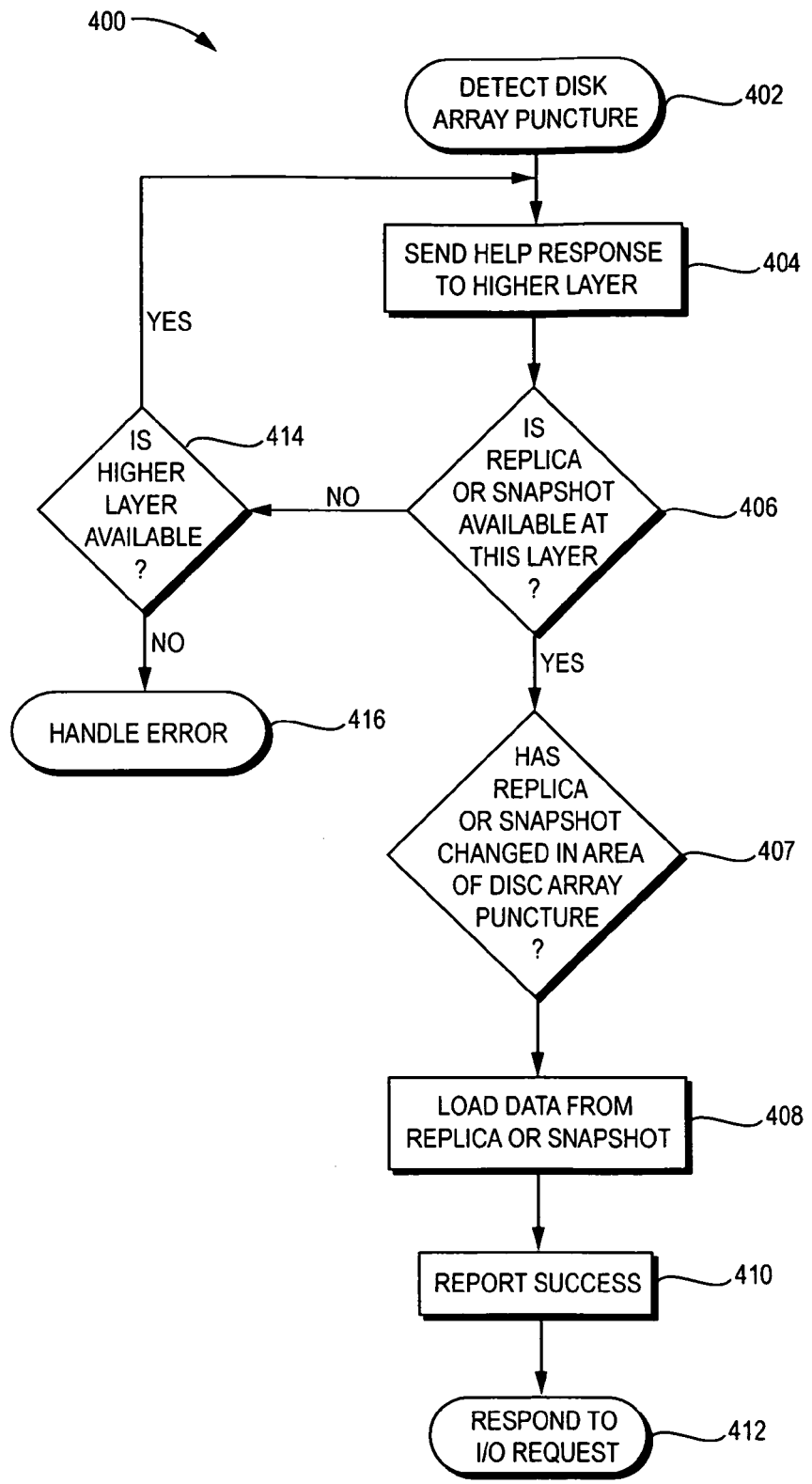
FIG. 3 is a flow diagram illustrating an example embodiment of the present invention.

FIG. 3 is a flow diagram 400 illustrating an example embodiment of the present invention. The method detects a disk array puncture in RAID array (402). Then, the method determines whether a replica or snapshot is available (406). If a replica or snapshot is not available, the system reports an error (416). If a replica or snapshot is available, the method sends a help response to a replica or snapshot (404). The method then determines whether the replica or snapshot has changed in an area of the disc array puncture (407). If the replica or snapshot has not changed, the method then loads data from the replica or snapshot (408). The method then reports success (410) and responds to the I/O request (412). If the replica or snapshot has changed, and therefore the replica or snapshot is out of date, the method determines whether there is another replica or snapshot available (406).

It should also be known that, while the foregoing system and method describes RAID arrays and RAID punctures, that these embodiments may be generalized to any generic storage system that handles data loss.

Figure 4:
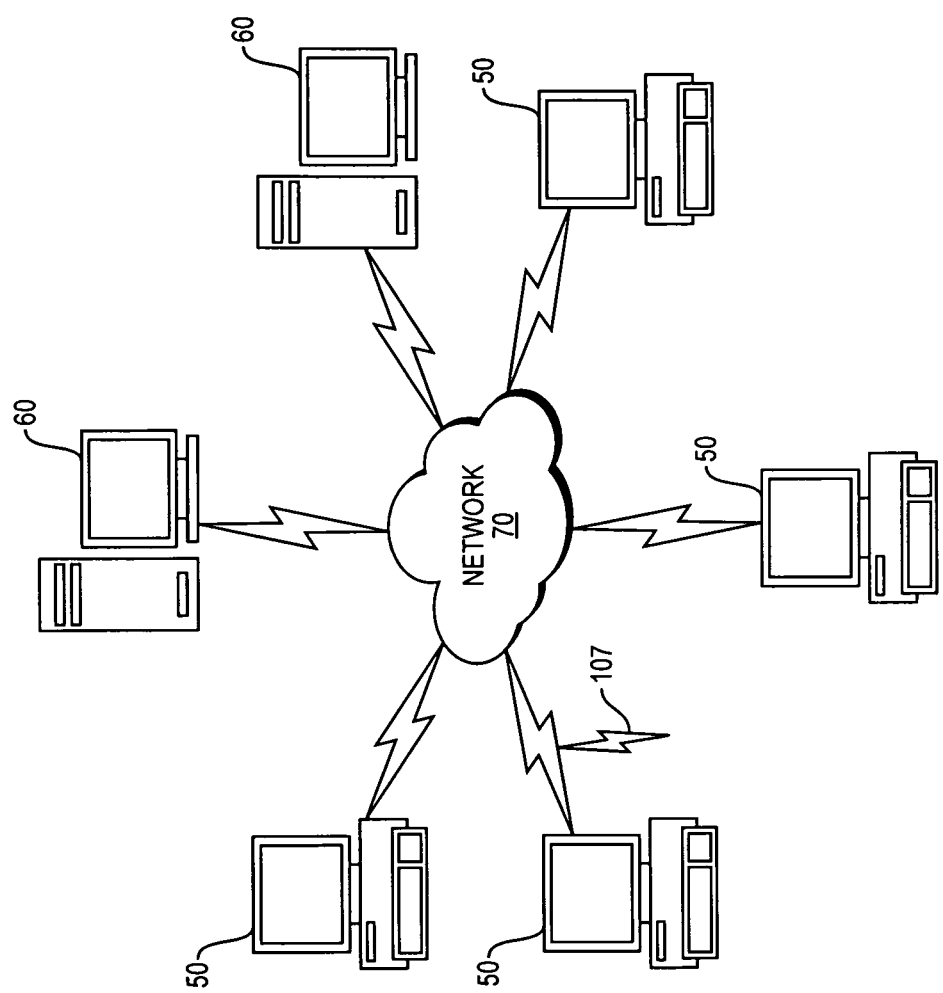
FIG. 4 illustrates a computer network or similar digital processing environment in which the present invention may be implemented.

FIG. 4 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 5:
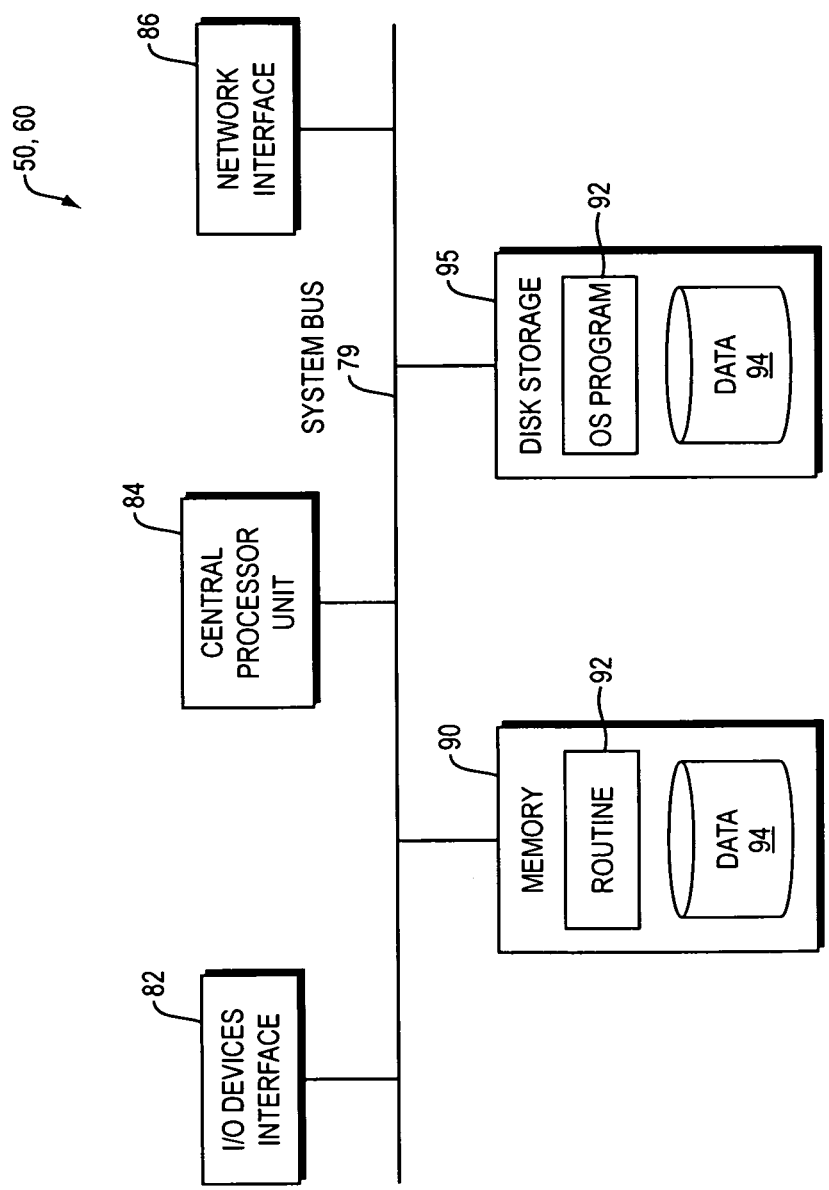
FIG. 5 is a diagram of the internal structure of a computer (e.g., client processor/device or server computers) in the computer system of FIG. 4.

FIG. 5 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Figure 6A:
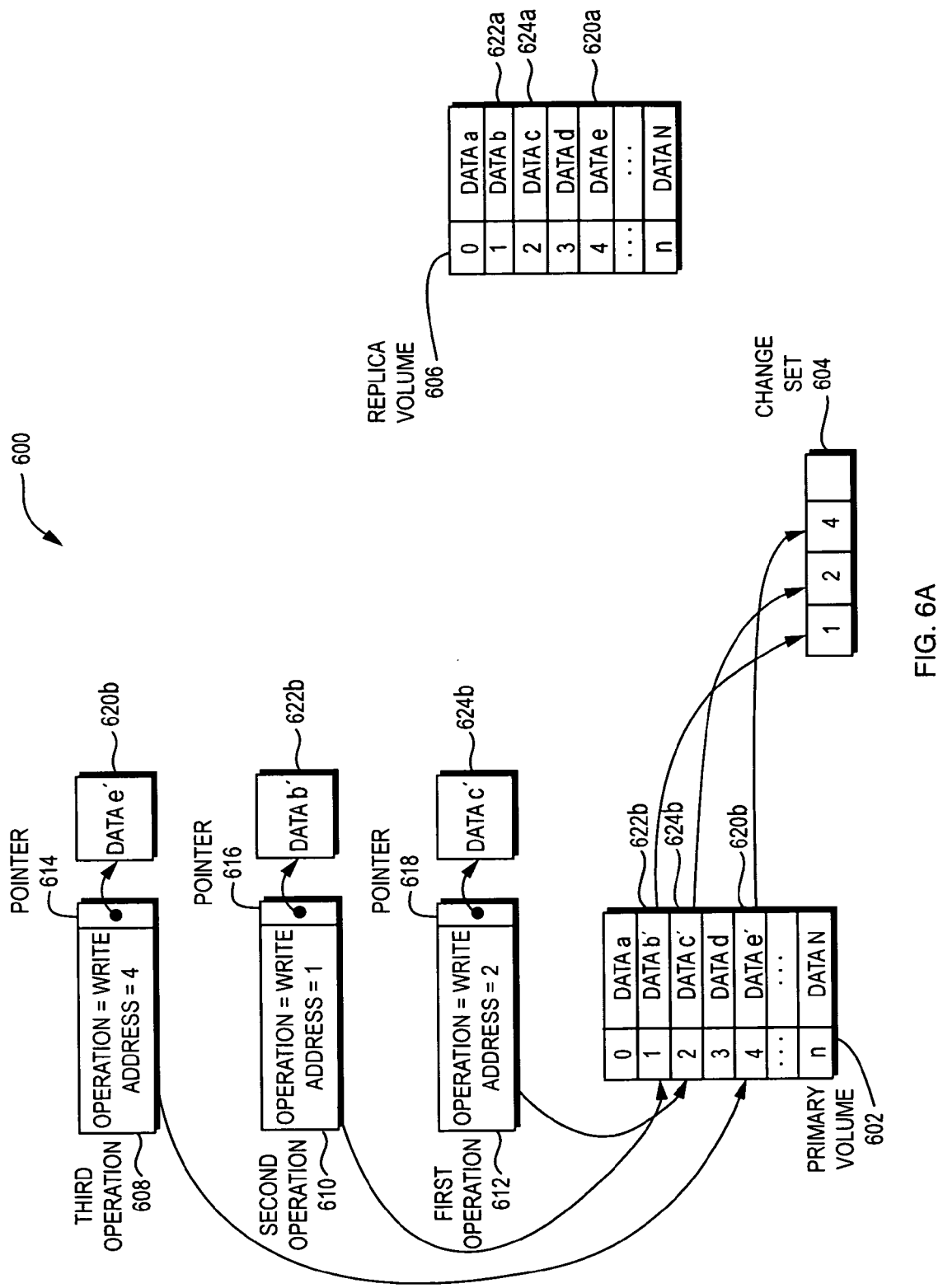
FIG. 6A is a block diagram illustrating an example embodiment of a primary volume.

FIG. 6A is a block diagram 600 illustrating an example embodiment of a primary volume 602 with data addresses 0 . . . n, each of which stores a piece of data a . . . data N. The primary volume 602 is replicated in a replica volume 606. The replica volume 606 stores data b 622a, data c 624a and data e 620a, copied from the primary volume 602 at some point in time.

The primary volume 602 receives three write operations: a first operation 612, a second operation 610, and a third operation 608. The first operation 612 writes to address 2, replacing data c 624a with data c' 624b on the primary volume 602. Thus, address 2 is entered into the change set 604, indicating that address 2 is changed. The second operation 610 overwrites address 1, replacing data b 622a with data b' 622b. Thus, address 1 is entered into the change set 604 indicating that address 1 is changed. The third operation 608 overwrites address 4, replacing data e 620a with data e' 620b. Thus, address 4 is entered into the change set 604 indicating that address 4 is changed. Likewise, the replica volume 606 is identical to the primary volume 602 except for the data stored at the addresses listed in the change set 604.

The replica volume 606 of FIG. 6A can be configured to employ either asynchronous replication or synchronous replication, in the case where an exceptional condition (such as loss of network connectivity) has caused the replica volume 606 to lose synchronization with the primary volume 602.

Figure 6B:
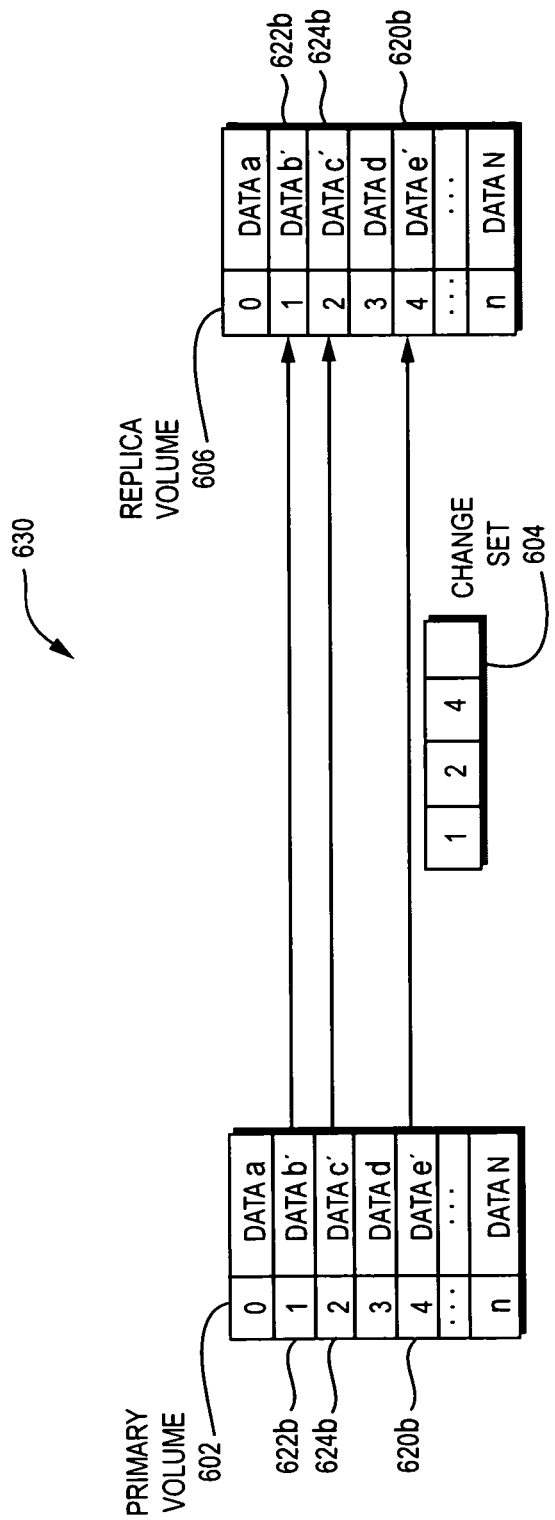
FIG. 6B is a block diagram illustrating an example embodiment of re-synchronizing the replica volume to the primary volume.

FIG. 6B is a block diagram 630 illustrating an example embodiment of re-synchronizing the replica volume 606 to the primary volume 602 (either after a replication interval expires, for asynchronous replicas, or when connectivity is restored, for synchronous replicas). Each address listed in the change set 604 is copied from the primary volume 602 to the replica volume 606, and then the address is cleared from the change set 604.

Figure 6C:
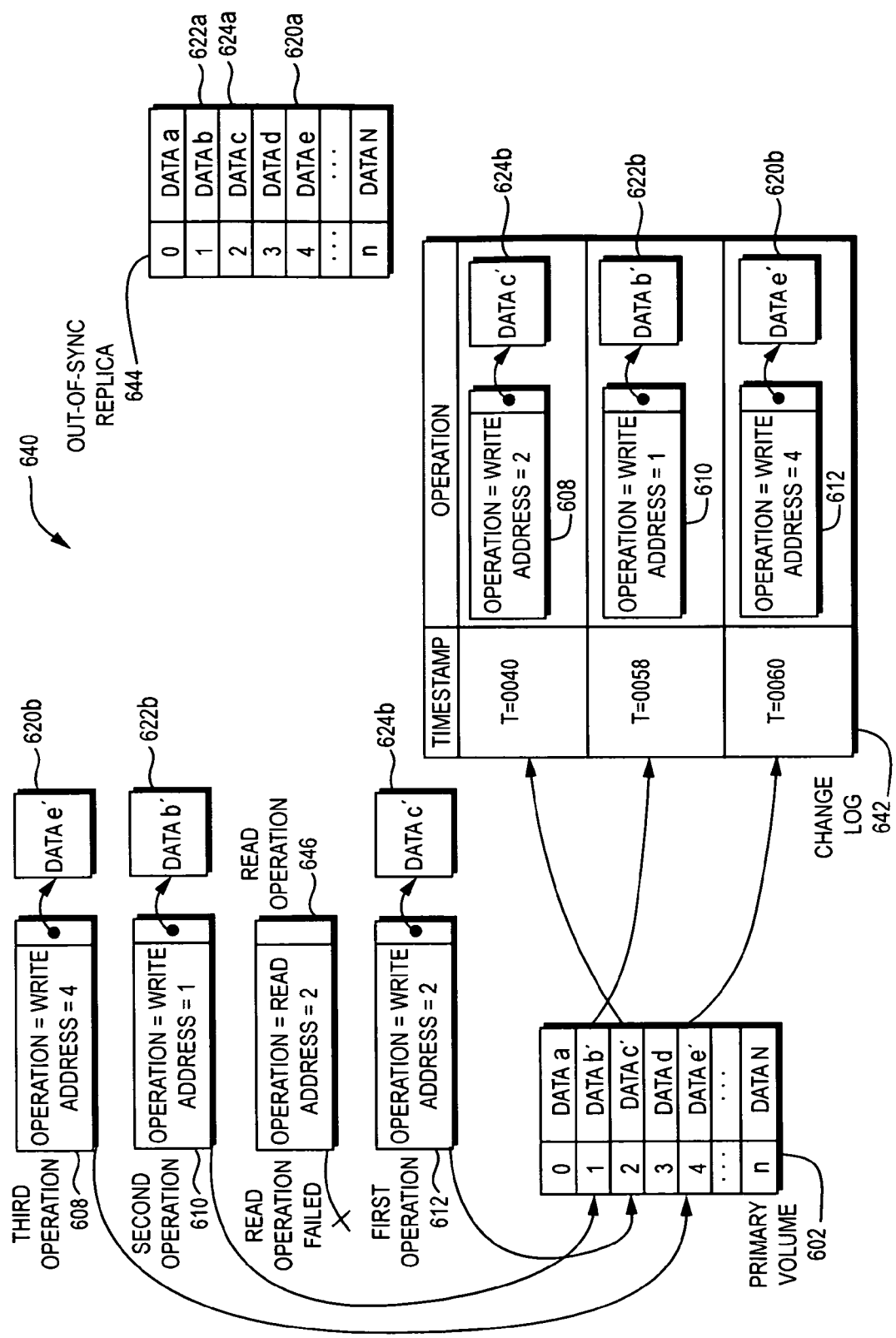
FIG. 6C is a block diagram illustrating an example embodiment of synchronous replication where an exceptional condition causes the replica to lose synchronization and become an out-of-sync replica.

FIG. 6C is a block diagram 640 illustrating an example embodiment of synchronous replication where an exceptional condition causes the replica to lose synchronization and become out-of-sync replica 644. It is similar to FIG. 6A, except for the use of a change log 642 (in place of, e.g., the change set 604 of FIG. 6A). Referring to FIG. 6C, the primary volume 602 receives the three operations 608, 610, and 612 and a read operation 646.

The first operation 612 overwrites address 2, replacing data c 624a with data c' 624b. Because the out-of-sync replica 644 is unreachable, the entire operation is appended to the (initially empty) change log 642, with a timestamp indicating the time at which the operation received by the primary volume 602. The read operation 646 then attempts to read address 2, but fails. However, time may elapse before the system detects the failure.

The volume thus proceeds to receive the second operation 610, which overwrites address 1, replacing data b 622a with data b' 622b. Because the out-of-sync replica 644 is unreachable, the entire operation is appended to the change log 642, with a timestamp indicating the time at which this operation was received the primary volume 602. The volume then receives the third operation 608, which overwrites address 1, replacing data e 620a with data e' 620b. Because the out-of-sync replica 644 is unreachable, the entire operation is appended to the change log 642, with a timestamp indicating the time at which this operation was received the primary volume 602.

The change log 642 is thus an ordered list of changes to be applied to the out-of-sync replica 644 to bring it back into synchronization.

Figure 6D:
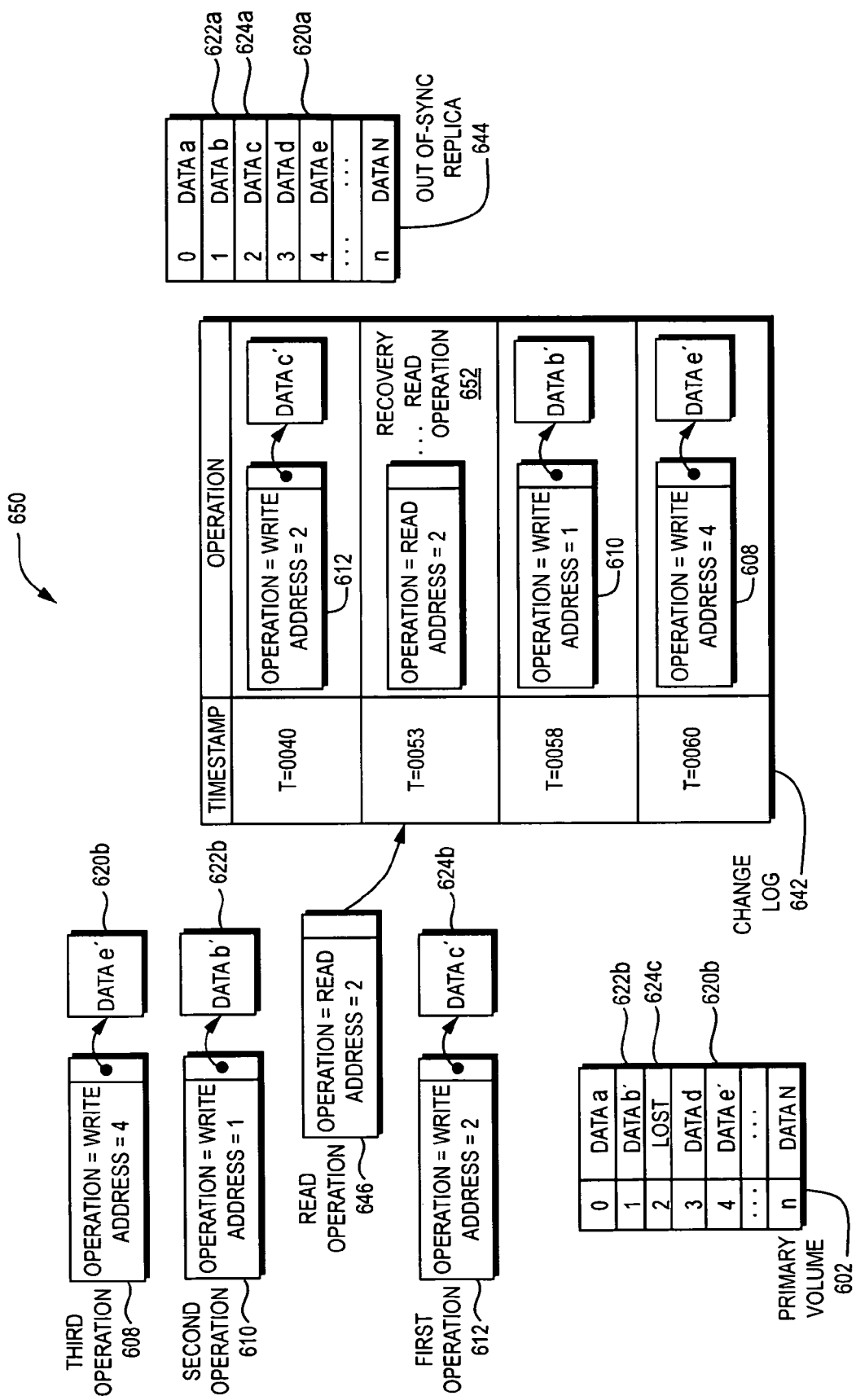
FIG. 6D is a block diagram illustrating the example embodiment of synchronous replication, continued from FIG. 6C.

FIG. 6D is a block diagram 650 illustrating the example embodiment of synchronous replication, continued from FIG. 6C. In FIG. 6D, the failure of the read operation 646, shown in FIG. 6C, has been detected. Detection of a read failure can be delayed on the order of minutes. If the replica volume 602 is synchronized, a recovery read operation is redirected to the replica at this time. However, since the out-of-sync replica 644 is unreachable, the recovery read operation 652 is instead inserted into the change log 642 at the chronological position corresponding to the time that the primary volume 602 received the original read operation 646 instead of the time that the failure is detected.

Figure 6E:
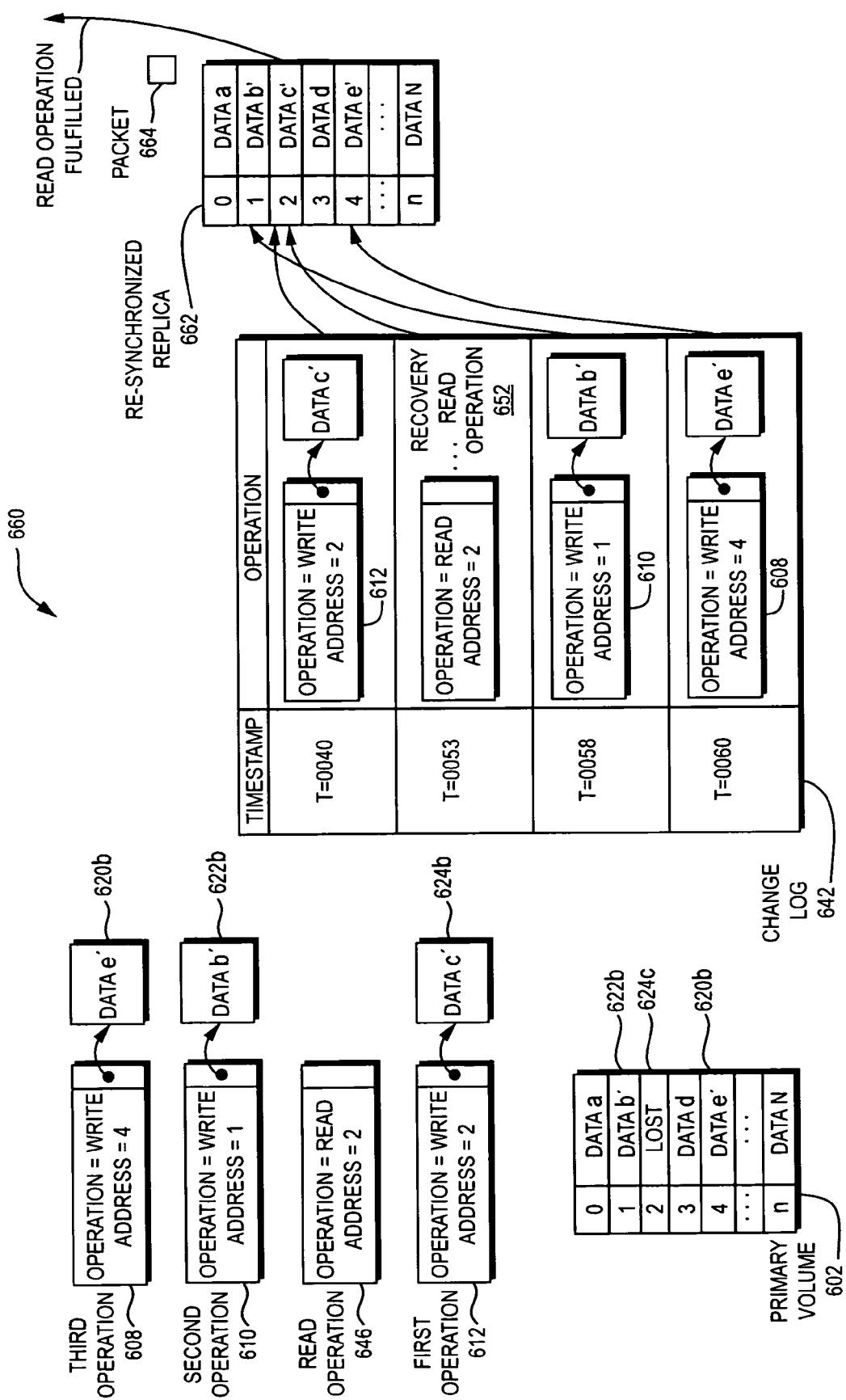
FIG. 6E is a block diagram illustrating the example embodiment of synchronous replication, continued from FIGS. 6C-D.

FIG. 6E is a block diagram 660 illustrating the example embodiment of synchronous replication, continued from FIGS. 6C-D. When communications is restored from the primary volume 602 to the re-synchronized replica 662 (shown as the out-of-sync replica 644 in FIG. 6D), the commands in the change log 642 are executed in chronological order to the resynchronized replica 662 to bring it back into synchronization. The first operation 612 stored in the log writes data c' 624b to address 2 in the re-synchronized replica

662. The recovery read operation 652 reads address 2 in the re-synchronized replica 662 and fulfills the original read request 646 by returning a read operation fulfilled packet 664. The second operation 610 writes data b' 622b to address 1 in the re-synchronized replica 662. The third operation 612 writes data e' 620b to address 4 in the re-synchronized replica 662.

While this invention has been particularly shown and described with references to example embodiments thereof, it will be understood by those skilled in the art that various changes in form and details may be made therein without departing from the scope of the invention encompassed by the appended claims.

What is claimed is:

1. A method of recovering data in a storage system, the method comprising:
    upon failure to fulfill an I/O request for requested data to a primary volume, consulting a change set to determine whether the requested data are current in a snapshot or replica, the change set indicating whether data have changed; and
    providing the requested data using the snapshot or replica without further accessing the change set, if the requested data are current in the snapshot or replica, or issuing an error or failure status, if the requested data are not current.

2. The method of claim 1, wherein the change set indicates at least one data in the snapshot or replica that is no longer current.

3. The method of claim 2, wherein the at least one data that is no longer current, has changed on a disk that services or houses the snapshot or replica.

4. The method of claim 1, further comprising:
    if the change set exists on a copy-on-write region, employing the change set to identify a delayed copy-on-write having the requested data.

5. The method of claim 1 further comprising:
    determining whether the requested data may exist in a synchronous replica;
    determining whether the synchronous replica is synchronized with the primary volume;
    consulting the change set, if the replica is unsynchronized, to determine whether the requested data are current in the snapshot or replica; and
    providing the requested data by accessing the synchronous replica, if the replica is synchronized or if the replica is unsynchronized but the requested data are current according to the change set or issuing an error or failure status, if the replica is unsynchronized and the requested data are not current according to the change set.

6. The method of claim 1 further comprising:
    determining whether the requested data may exist in a synchronous replica;
    determining whether the synchronous replica was synchronized with the primary volume at the time of the I/O request, and has remained synchronized since that time;
    if the replica is synchronized in this way, providing the requested data by accessing the synchronous replica;
    if the replica is not synchronized in this way, attempting to insert into a change log an access operation to provide the requested data by:
        if the I/O request occurred before the loss of synchronization, inserting the access operation at the head of the change log, if the head of the change log is still valid;
        if the I/O request occurred after the loss of synchronization, inserting the access operation at the tail of the change log, if the tail of the change log is still valid;
        if the I/O request occurred during the loss of synchronization, inserting the access operation within the change log in chronological order, if such a location in the change log is still valid;
    issuing an error or failure status, if the access operation cannot be inserted into a valid position in the change log; and
    applying or replaying the change log to the replica to restore synchronization, wherein any inserted access operations are fulfilled in chronological order with the applied changes.

7. The method of claim 6, wherein the change log includes at least one of an ordered list of changes to be applied to a replica to restore synchronization, and other operations such as data access requests; and entries in the change log are invalidated when successfully applied to the replica.

8. A system for coordinating data recovery in a storage system, the system comprising:
    a processor; and
    a memory with computer code instructions stored therein, the memory operatively coupled to said processor such that the computer code instructions configure the processor to implement:
    a look up module configured to, upon failure to fulfill an I/O request for requested data to a primary volume, consult a change set to determine whether the requested data are current in a snapshot or replica, the change set indicating whether data have changed; and
    a response module configured to provide the requested data using the snapshot or replica without further accessing the change set, if the requested data are current in the snapshot or replica, or issue an error or failure status, if the requested data are not current.

9. The system of claim 8, wherein the change set indicates at least one data in the snapshot or replica that is no longer current.

10. The system of claim 9, wherein the at least one data that is no longer current, has changed on a disk that services or houses the snapshot or replica.

11. The system of claim 8, wherein the response module is further configured to, if the change set exists on a copy-on-write region, employ the change set to identify a delayed copy-on-write having the requested data.

12. The system of claim 8, wherein the look up module is further configured to determine whether the requested data may exist in a synchronous replica and determine whether the synchronous replica is synchronized with the primary volume;
    wherein the look up module is further configured to consult the change set, if the replica is unsynchronized, to determine whether the requested data are current in the snapshot or replica; and
    wherein the response module is further configured to provide the requested data by accessing the synchronous replica, if the replica is synchronized or if the replica is unsynchronized but the requested data are current according to the change set, or issue an error or failure status, if the replica is unsynchronized and the requested data are not current according to the change set.

13. The system of claim 8, wherein the look up module is further configured to determine whether the requested data may exist in a synchronous replica and determine whether the synchronous replica was synchronized with the primary volume at the time of the I/O request, and has remained synchronized since that time; and
    wherein the response module is configured to, if the replica is synchronized in this way, provide the requested data by accessing the synchronous replica, or, if the replica is not synchronized in this way, attempt to insert into a change log an access operation to provide the requested data by:
  if the I/O request occurred before the loss of synchronization, inserting the access operation at the head of the change log, if the head of the change log is still valid;
  if the I/O request occurred after the loss of synchronization, inserting the access operation at the tail of the change log, if the tail of the change log is still valid;
  if the I/O request occurred during the loss of synchronization, inserting the access operation within the change log in chronological order, if such a location in the change log is still valid; and
issue an error or failure status, if the access operation cannot be inserted into a valid position in the change log, and applying or replaying the change log to the replica to restore synchronization, wherein any inserted access operations are fulfilled in chronological order with the applied changes.

14. The system of claim 13, wherein the change log includes at least one of an ordered list of changes to be applied to a replica to restore synchronization, and other operations such as data access requests; and wherein entries in the change set are invalidated when successfully applied to the replica.

15. A non-transitory computer readable medium configured to store instructions for coordinating data recovery in a storage system to be executed by a processor, the instructions comprising:
  upon failure to fulfill an I/O request for requested data to a primary volume, consulting a change set to determine whether the requested data are current in a snapshot or replica, the change set indicating whether data have changed; and
  providing the requested data using the snapshot or replica without further accessing the change set, if the requested data are current, or issuing an error or failure status, if the requested data are not current.

16. The non-transitory computer readable medium of claim 15, wherein the change set indicates at least one data in the snapshot or replica that is no longer current, such as if the at least one data that is no longer current has changed on a disk that services or houses the snapshot or replica.

17. The non-transitory computer readable medium of claim 15, further comprising:
  determining whether the requested data may exist in a synchronous replica;
  determining whether the synchronous replica is synchronized with the primary volume;
  consulting the change set, if the replica is unsynchronized, to determine whether the requested data are current in the snapshot or replica; and
  providing the requested data by accessing the synchronous replica, if the replica is synchronized or if the replica is unsynchronized but the requested data are current according to the change set or issuing an error or failure status, if the replica is unsynchronized and the requested data are not current according to the change set.

18. The non-transitory computer readable medium of claim 15 further comprising:
  determining whether the requested data may exist in a synchronous replica;
  determining whether the synchronous replica was synchronized with the primary volume at the time of the I/O request, and has remained synchronized since that time;
  if the replica is synchronized in this way, providing the requested data by accessing the synchronous replica;
  if the replica is not synchronized in this way, attempting to insert into a change log an access operation to provide the requested data by:
    if the I/O request occurred before the loss of synchronization, inserting the access operation at the head of the change log, if the head of the change log is still valid;
    if the I/O request occurred after the loss of synchronization, inserting the access operation at the tail of the change log, if the tail of the change log is still valid;
    if the I/O request occurred during the loss of synchronization, inserting the access operation within the change log in chronological order, if such a location in the change log is still valid;
  issuing an error or failure status, if the access operation cannot be inserted into a valid position in the change log; and
  applying or replaying the change log to the replica to restore synchronization, wherein any inserted access operations are fulfilled in chronological order with the applied changes.

19. The non-transitory computer readable medium of claim 18, wherein the change log comprises an ordered list of changes to be applied to a replica to restore synchronization, and may also contain other operations such as data access requests; and entries in the change log are invalidated when successfully applied to the replica.

20. The non-transitory computer readable medium of claim 15 wherein the instructions further comprise:
  if the change set exists on a copy-on-write region, employing the change set to identify a delayed copy-on-write having the requested data.

* * * * *